United States Patent [19]

Dalrymple

[11] Patent Number: 4,635,371

[45] Date of Patent: Jan. 13, 1987

[54] DEVICE TO INDICATE SOLAR EXPOSURE

[76] Inventor: Michael B. Dalrymple, 24 Dickens Cir., Salinas, Calif. 93901

[21] Appl. No.: 830,565

[22] Filed: Feb. 18, 1986

Related U.S. Application Data

[63] Continuation of Ser. No. 613,824, May 25, 1984, abandoned.

[51] Int. Cl.$^4$ .............................................. G01C 1/00
[52] U.S. Cl. ..................................... 33/1 DD; 33/268
[58] Field of Search ............. 33/1 DD, 268, 269, 270, 33/271

[56] References Cited

U.S. PATENT DOCUMENTS 4,177,566 12/1979 Haines ................................ 33/1 DD
4,288,922 9/1981 Lewis ................................ 33/1 DD

FOREIGN PATENT DOCUMENTS 634650 2/1983 Switzerland ........................... 33/268

Primary Examiner—Charles Frankfort
Assistant Examiner—Patrick R. Scanlon
Attorney, Agent, or Firm—Flehr, Hohbach, Test, Albritton & Herbert

[57] ABSTRACT

A device for determining the annual exposure of a site which comprises a viewer having a lens with markings provided thereon for determining the line of travel of the sun at a given latitude for selected dates of the year and indicating the position of the sun at selected times of the day. Interchangeable lenses are provided for different latitudes and are changed by removing a bezel which attaches the lens to the hollow cylindrical body of the device.

4 Claims, 3 Drawing Figures

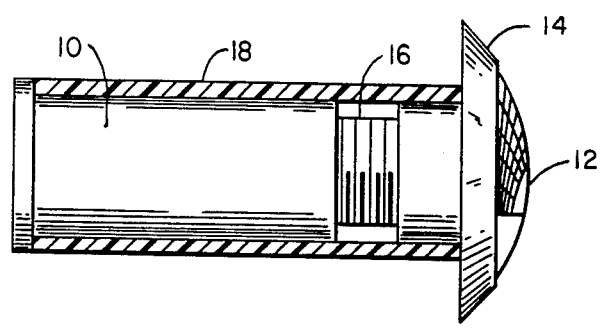
FIG.—1
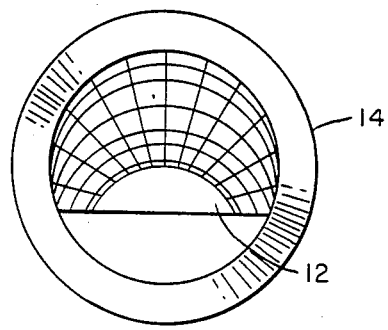
FIG.—2
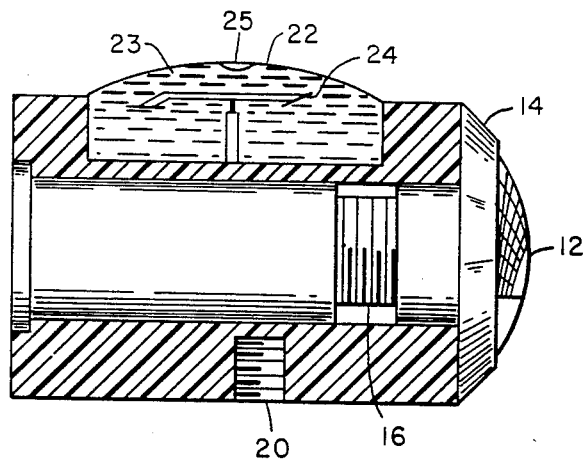
FIG.—3

DEVICE TO INDICATE SOLAR EXPOSURE

This is a continuation of application Ser. No. 613,824 filed May 25, 1984, now abandoned.

BACKGROUND OF THE INVENTION

In our energy conscious world efficient solar design and engineering have become the norm. All across the country cities have adopted ordinances requiring an assessment of the solar efficiency of new construction. From time to time various states and the Federal government have offered tax benefits and credits for the installation of solar aided systems. When selecting the location of a home on a particular site, it is desirable to know which areas will be sunny in the winter and will be shaded in the summer; or which trees would block the sun. If the structure is to use a solar energy collector, it is essential to know whether the collector will be exposed to sunlight on a year-round basis. The path the sun travels can frequently pass behind trees, hills or other structures, placing portions of a specific site in shadows at sometime of the year and for some portion of each day. It is not only important to know whether anything will obscure sunlight, but also to know how long sunlight will be obscured and at what time of day during what months or what time of year.

Heretofore such information was acquired by using a device like that disclosed in U.S. Pat. No. 4,288,922. That patent discloses a table having an arcurate transparent screen provided with markings which indicate the path of the sun and the time of day for each of a number of specific dates. A viewer is disposed on the table so that someone looking through the viewer could examine the site and know where and when sunlight might be blocked.

In rural settings, as well as some urban settings, it is very inconvenient to transport a table and other paraphernalia around a site. The terrain may be uneven or so removed from civilization that streets and roadways are not available. In such circumstances carrying the table described in U.S. Pat. No. 4,288,922 would be extremely inconvenient. The transparencies described in the '922 patent are easily lost or damaged, and in windy situations may be blown off.

SUMMARY OF THE INVENTION

Accordingly, it is an object of this invention to provide an improved device to indicate solar exposure. It is a further object of the present invention to provide such a device that is easily transported, simple to use and light weight.

The device of the present invention comprises a viewer having a lens, preferably wide angle, with markings provided thereon, such markings indicating the line of travel of the sun at a given latitude for selected or all dates of the year, and indicating the position of the sun at selected times of the day. The lens is attached to a hollow cylindrical body, preferably by a bezel which fits over the lens and screws into the body. In another embodiment of the present invention, the hollow cylindrical body is provided with a capped liquid filled reservoir on the top of the viewer which encloses a compass needle and an air bubble to indicate level.

BRIEF DESCRIPTION OF THE DRAWINGS

FIG. 1 is a side plan view of an embodiment of the present invention.

FIG. 2 is an end-on view through an embodiment of the present invention.

FIG. 3 is a side plan view of another embodiment of the present invention.

DETAILED DESCRIPTION OF THE INVENTION

Referring first to FIG. 1, this embodiment of the present invention illustrates the simplicity of [my device] viewer 10. A lens 12 is attached to one end of the hollow cylindrical body 18 by attachment means, preferably a bezel 14. In the embodiment illustrated in FIG. 1, the bezel fits over the lens and screws into the body, utilizing threads 16. The lens is preferably wide angle so that when viewed through the end of the hollow cylindrical body opposite lens 12 a large section of the area being examined is in the viewer 10 at one time.

The lens is provided with markings that indicate the path of the sun and the time of day for each of a number of specific dates. The markings provided on the lens are different for each latitude and are interchangeable by unscrewing the bezel and replacing the lens. Normally, an engineer or architect will need only one lens because his range of operations would be local, however, lenses for different latitudes would be relatively inexpensive and could be interchanged.

As shown in FIG. 2, the markings on the lens include a number of arcuate lines which depict the path of the sun with respect to the horizon at specific times of the year. The horizontal line towards the bottom of the lens provides a horizon, the vertical line and the other radial lines provide time information. For example, in the preferred embodiment, the vertical line is designated solar noon, the radial lines to the right of solar noon indicate one hour, two hours, three hours, four hours, and five hours after solar noon; the radial lines to the left of solar noon designate hours prior to solar noon. The arcuate lines relate to the time of year, with the upper most of these lines indicating the path the sun will travel at the equinox, specifically, Mar. 21 and Sept. 21. In another embodiment, the uppermost arcuate line may indicate the path of the sun at the summer solstice, June 21. The lower most arcuate line depicts the path the sun will follow at the winter solstice, Dec. 21. The intervening lines may be designated on a month-by-month basis.

Referring to FIG. 3, this embodiment of the present invention adds a leveling device, a compass and means for attaching the viewer to a tripod. A liquid impermeable transparent cover 22 is disposed over and encloses a liquid medium 23, preferably a light weight mineral oil. A compass needle 24 is disposed underneath the cover and is used to indicate magnetic north. A bubble 25 is provided within the cover to determine whether or not the viewer is level. A threaded hole 20 is provided so that the viewer may be mounted on a tripod.

In use, the device of this invention is provided with a lens with arcuate and radial marking pertinent to the latitude of the site being investigated for solar exposure. In rough terrain the device may be hand-held, or alternatively, mounted on a tripod. The device is oriented in a generally southern direction and the scene viewed through the lens will provide information concerning solar exposure at any particular time of year and time of day.

The embodiments shown are illustrative only, and many variations and modifications may be made without departing from the principles of the invention herein disclosed and defined by the appended claims.

What I claim is:

1. A lightweight portable hand-held device for investigating annual solar exposure of a specific site, comprising: a hollow cylindrical body having a first end and a second end and adapted to be held in one hand, and a transparent lens attached to said first end of said body, said lens having arcuate and radial markings indicating the line of travel of the sun at a given latitude for selected dates of the year and for selected times of the day, such that when said site is viewed through said second end of said body and said lens, said arcuate and radial markings are superimposed over the view of said site as seen through said body to thereby provide an indication of the solar exposure at said specific site.

2. The device of claim 1 having means to fix said device to a tripod.

3. The device of claim 1 wherein said lens is interchangeable with other lenses for use with different latitudes.

4. The device of claim 1 wherein a level and a compass are provided on said body.